Figure 1:
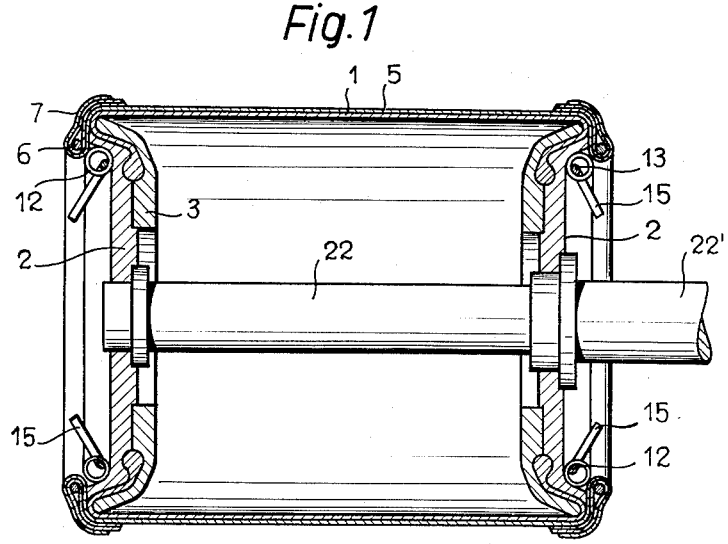

June 13, 1961  M. VANZO ET AL  2,988,132
APPARATUS FOR BUILDING AND SHAPING PNEUMATIC TIRES
Filed April 8, 1958

2,988,132
APPARATUS FOR BUILDING AND SHAPING PNEUMATIC TIRES

Marcello Vanzo, Dario Giletta, and Antonio Pacciarini, Milan, Italy, assignors to Pirelli Societa per Azioni, Milan, Italy
Filed Apr. 8, 1958, Ser. No. 727,071
Claims priority, application Italy Apr. 11, 1957
2 Claims. (Cl. 154—10)

This invention relates to an apparatus for building and shaping tires according to the prior U.S.A. Patent No. 2,814,330, issued November 26, 1957 to Vanzo et al., assignors to Pirelli S.p.A.

The present invention concerns itself with a tire building drum of the type having a resilient and deformable diaphragm mounted between two spaced and rigid end discs which are movable relatively towards and away from each other; more specifically, the present invention relates to a provision in each end disc which permits spreading, mechanically, of the edges of the plies about the bead wire. First of all, the present invention permits, in a mechanical manner, the outward turning of the edges of a first ply which is placed on the building drum immediately prior to the locating of the bead wires at the sides of the drum; and secondly, the present invention permits the inward turning, in a mechanical manner, of the edges of a second ply which is superimposed upon the first ply after the outward turning of the edges of said first ply.

In the case of prior-art tire-building drums, for example such as described in the aforementioned United States patent, it is not possible to turn the edges of the ply inwardly or outwardly about the beads, in a mechanical manner, because the beads are located in seats which are inaccessible to any mechanical devices which might be capable of turning the edges. Therefore, with regard to prior-art building drums, it is necessary that the turning operation be performed by hand.

An apparatus of the type shown in the above patent comprises a rotatable building drum including two spaced discs and a resilient deformable sheet defining the surface of the drum fixed to said end discs, means for relatively moving said discs towards each other and apart, and means for inflating said drum when said discs are moved toward each other to cause said resilient sheet to deform to toric shape. A circumferential region of each of the two discs has formed thereon a bead seat of a diameter lesser than the outer diameter of the sides of the drum, said bead seat being defined by an annular surface forming an axial abutment for a bead merging into a generally cylindrical annular surface which serves for supporting a bead radially from inside towards the outside.

The manufacture of a tire by means of the prior-art apparatus referred to above generally comprises the steps of laying plies of tire building fabric about the drum, turning the edges of the fabric inwardly at the sides of the drum to form bead seats smaller in diameter than the outer diameter of the sides of the drum, locating beads in said bead seats, applying additional plies of fabric over said first-mentioned plies and beads, and thereafter expanding the body of the drum to bring the central portion of the carcass to approximately its final circumference while moving the beads together.

Since the beads are located in said seats, handling of the fabric edges on an apparatus of the type just referred to is a serious problem. For the shape of the discs and seats therein prevents the use of mechanical devices adapted to expand or spread the fabric edges and turn them about the beads, so that the steps of spreading and turning the fabric edges up and down should be carried out manually.

The main object of this invention is to improve the apparatus of the type referred to above to permit of mechanically carrying out the steps of spreading and turning the edges up and down.

According to a general characteristic feature of this invention the annular surface forming an axial abutment for a bead on each of the discs directly merges throughout its radially internal edge with a front recess in its associated disc, so that a bead fitted to the annular abutment surface is freely accessible on its surface facing the axis of the drum, and a device for spreading the fabric edges can be temporarily accommodated by said front recess for expanding at the proper time the edges of the fabric first laid on the drum.

An embodiment of this invention shall now be described with reference to the accompanying drawing, on which essential components for the understanding of the invention have been shown, the further components of the apparatus being of course similar in construction and arrangement as disclosed by the prior patent referred to above unless otherwise stated.

Figure 2:
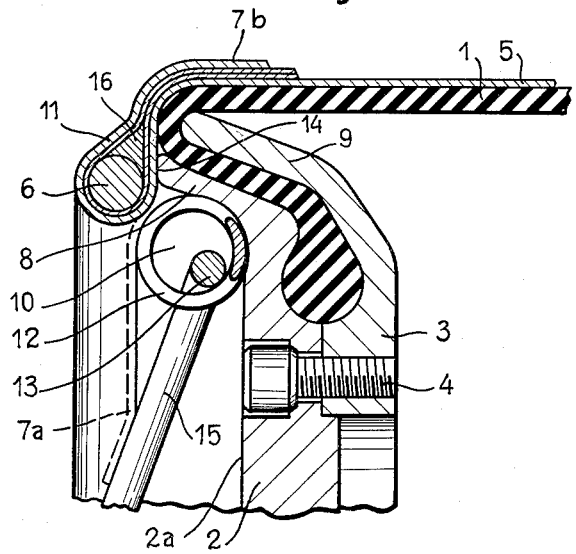

FIGURE 1 is an axial sectional view of the drum and
FIGURE 2 is a detail view of FIGURE 1 on a somewhat greater scale.

Generally, as stated above, the building drum shown on the drawing is similar to the drum disclosed by the prior patent referred to and comprises a skirt (or sheet) 1 consisting of a tubular diaphragm of expansible resilient material, and two rigid end discs 2. The edges of the skirt 1 are of enlarged cross-sectional area and are each clamped in fluid-tight manner between the respective disc 2 and a metal ring 3 by means of bolts such as 4. The disc 2 are securedly fixed to telescoping shafts 22, 22', which are capable of axial displacement on each other but are kept against relative rotation. The shafts 22, 22' have suitable conduits (not shown) extending longitudinally therethrough, so that compressed air can be delivered to the drum-inside for radially expanding the resilient skirt 1 while at the same time the discs 2 are drawn together, or air can be evacuated from the drum, in a manner and for the purposes known per se from the prior patent cited.

According to this invention and as more clearly visible in FIGURE 2, the discs 2 each include a flanged portion or circumferential rim 8 extending from the general plane of the disc in a direction opposite with respect of the other disc, so that the radially inner surface of the said rim 8 and the axially outer face 2a on the disc 2 jointly define a front recess 10. In other words, each disc 2 is substantially dish-shaped, the cavity or recess 10 of each disc facing outwardly but being inwardly directed towards the other disc. In the embodiment shown the rim 8 is of a generally frusto-conical shape converging towards the drum-inside and has a terminal face 14 which is flat and is situated in a plane perpendicular to the drum axis. The ring 3 is accordingly formed with a flange or circumferential rim 9 of generally frusto-conical shape, of such size that the skirt 1 axially extends to the plane of the face 14 and is then bent backwardly with respect to said plane and is clamped in a fluid-tight manner between the rims 8 and 9. It should further be noted that the face 14 is externally directly adjacent to the expansible skirt 1.

The axial depth of the space 10 is of sufficient extent for accommodating a spreading device therein. In the embodiment shown on the drawing the spreading device is of the type disclosed by the prior U.S. patent application Ser. No. 506,942, filed May 9, 1955, now Patent No. 2,878,856 and comprises a helical spring 12 of ring-shape which is mounted in a pre-compressed condition on a rigid ring 13 connected by spokes 15 to a central hub (not shown) which is capable of axial displacement by a suitable control. The spokes 15 extend between turns of the helical spring 12. As will be seen from the drawing, in the position shown the spring 12 axially bears on the face 2a on the disc 2 and radially bears on the radially inner surface on the rim 8.

In operation, assuming the drum is initially under the conditions shown on the drawing having its skirt 1 fully extended to its cylindrical shape with rectilinear generatrices and springs 12 accommodated within the spaces 10, a cord fabric ply such as 5 is laid on the drum in a tubular formation, its size being such that the fabric edges 7 extend beyond the rims 8 on the end discs 2. Said edges are then bent down by means known per se towards the drum axis to the position diagrammatically shown at 7a in FIGURE 2. The bead wires 6 are separately prepared, each bead wire being wrapped by a cord fabric strip 11 so that the fabric 11, seen in cross section, forms a loop about the cross-sectional profile of the bead 6.

If desired, a filling 16 can be placed into the bead. The bead ready for assembly is then pressed in a centred position against the flat face 14 on the rim 8 through the interposition of the fabric 5, as will be seen in FIGURE 2. Since the fabric plies 5 and 11 include crude rubber, the fabric 11 firmly sticks to the fabric 5 thereby maintaining the bead in its centered position. By pulling the spokes 15 to the left on FIGURE 2, the rigid ring 13 carries along the helical spring 12 which in turn engages the edge 7a on the fabric 5, spreads and turns it up about the bead 6 in a super-posed relationship to the fabric 11. In this step the edge 7a is but partly turned up but takes a sufficiently spread-out configuration permitting of rolling devices known per se to promptly come into action and complete the turning up of said edge to its position denoted by 7b in FIGURE 2.

After the edges 7a have reached their position denoted by 7b in FIGURE 2, a further fabric ply can be laid. The edges of said ply also will freely extend beyond the beads and are turned down towards the drum axis by means of the usual rolling devices which, owing to the characteristic features of this invention, are now in a condition to turn down said edges about the beads. The further building steps such as fitting of the tread and flanks of the tire cover will be thereafter carried out in a manner known per se.

As will be seen from FIGURE 2, the outer diameter of the ring formed by the helical spring 12, when the latter is received by the recess 10, is slightly larger than the inner diameter of the bead 6. Consequently, when the spring 12 is pulled to the left on the figure, the spring is slightly compressed thereby increasing the load under which the edge 7a on the fabric 5 is pressed against the bead.

It will be understood, that this invention is not limited to the embodiment shown on the drawing and constructional details thereof can be modified, if desired, within the limits of technical equivalents, provided in any case the discs on the drum of the type referred to have each an axial abutment surface for a bead equivalent to the surface 14 which directly merges throughout its radially inner edge into a front recess equivalent to the recess 10.

What we claim is:

1. An apparatus for building and shaping pneumatic tires comprising a building drum including two spaced end discs and a resilient deformable sheet of cylindrical shape defining the outer periphery of the drum and having its opposite edges fixed to said end discs, said discs being movable towards and away from each other, said sheet being inflatable for deformation to a toric shape when said end discs are moved towards each other, the outer face of each end disc being provided with an axial abutment for beads of a diameter smaller than the outer diameter of the drum, each end disc being provided with a central recess in its outer face merging into the surface of said outer face of said disc adjacent said abutment, said recess being deep enough to accommodate a mechanical device, whereby, after a ply of cord fabric has been wound on said drum and the edges of said ply have been turned inwardly and downwardly against said abutments so as to form, over each abutment, an annular surface perpendicular to the axis of said drum, and after a bead of smaller diameter than the diameter of said drum has been placed against the annular surface formed by the ply edge over said abutment, said mechanical device will spread progressively and simultaneously throughout the whole circumference of the bead the ply edge about the bead, the bead located against said annular surface being freely accessible over its zone facing the drum axis before the spreading operation.

2. An apparatus for building and shaping pneumatic tires comprising a building drum including two spaced end discs and a resilient deformable sheet of cylindrical shape defining the outer periphery of the drum and having its opposite edges fixed to said end discs, said discs being movable towards and away from each other, said sheet being inflatable for deformation to a toric shape when said end discs are moved towards each other, the outer face of each end disc being provided with an axial abutment for beads of a diameter smaller than the outer diameter of the drum, each end disc being provided with a central recess in its outer face merging into the surface of said outer face of the disc adjacent said abutment, said recess being deep enough to accommodate a mechanical spreader device, whereby, after a ply of cord fabric has been wound on said drum and the edges of said ply have been turned inwardly and downwardly against said abutments so as to form, over each abutment, an annular surface perpendicular to the axis of said drum, and after a bead of smaller diameter than the diameter of said drum has been placed against the annular surface formed by the ply edge over said abutment, said mechanical device will spread progressively and simultaneously throughout the whole circumference of the bead the ply edge about the bead, the bead located against said annular surface being freely accessible over its zone facing the drum axis before the spreading operation, the end discs of the drum each comprising an outer dish-shaped element, the outer rim of which is of trunco-conical shape and projects outwardly of the drum, thereby defining the recess for receiving the mechanical spreader device, the edge of said outer rim forming the inner part of said axial abutment, and an inner ring-shaped element having an outer rim of trunco-conical shape overlapping the rim of said dish-shaped element, the edges of said resilient deformable sheet being pinched between said rims, the rim of said ring-shaped element being of such a length that the edge of said resilient deformable sheet bent about the edge of the last mentioned rim has its outer surface coplanar with the edge of the rim of said dish-shaped element and forms the outer part of the axial abutment for the ply edge and for the bead, and means for securing together said dish-shaped and ring-shaped elements.

References Cited in the file of this patent

UNITED STATES PATENTS

| | | |
|---|---|---|
| 2,084,009 | Sohl | June 15, 1937 |
| 2,182,176 | Maranville | Dec. 5, 1939 |
| 2,409,974 | Breth | Oct. 22, 1946 |
| 2,614,951 | Iredell | Oct. 21, 1952 |
| 2,754,884 | Jefferys | July 17, 1956 |
| 2,814,330 | Vanzo et al. | Nov. 26, 1957 |
| 2,814,331 | Vanzo et al. | Nov. 26, 1957 |
| 2,838,092 | McMahon | June 10, 1958 |

FOREIGN PATENTS

| | | |
|---|---|---|
| 463,422 | Canada | Feb. 28, 1950 |
| 856,513 | Germany | Nov. 20, 1952 |
| 736,007 | Great Britain | Aug. 31, 1955 |
| 1,132,033 | France | Oct. 29, 1956 |